United States Patent Office 3,639,511
Patented Feb. 1, 1972

3,639,511
PROCESS FOR THE PRODUCTION OF IMPACT-RESISTANT STYRENE MIXED POLYMERS
Kurt Kreibich, Marl, Germany, assignor to Chemische Werke Huls Aktiengesellschaft, Marl, Kreis Recklinghausen, Germany
No Drawing. Filed May 21, 1965, Ser. No. 457,833
Claims priority, application Germany, June 10, 1964,
P 12 47 021.2-44
Int. Cl. C08f 15/04
U.S. Cl. 260—878                         2 Claims

ABSTRACT OF THE DISCLOSURE

An improvement in the process for making impact-resistant styrene mixed polymers and the product obtained thereby wherein a terpolymer of ethylene, propylene and non-conjugated diolefins with at least 5 carbon atoms is prepared in the presence of Ziegler copolymerization catalysts and the terpolymer has 1 to 3 double bonds per 1000 carbon atoms, mixing 2 to 20 percent of the terpolymer with 98 to 80 percent of styrene in an aqueous suspension and without preliminary ozonization polymerizing the mixture.

---

It is an object of the present invention to produce a mixed polymer from styrene and a terpolymer comprising ethylene, propylene and multiolefins, especially straight-chain or cyclic, non-conjugated diolefins.

It is a further object of the present invention to produce a mixed polymer from styrene, copolymerizable monomers and a terpolymer comprising ethylene, propylene and multiolefins, especially non-conjugated diolefins.

According to the prior art, impact resistant polystyrene is obtained by polymerizing styrene with natural or synthetic rubber. The impact resistant products produced therefrom have such disadvantages as becoming brittle because of the action of air and light on the diolefinic double bonds therein.

It is also known that the ageing tendency can be controlled by the addition of polyolefins such as polyethylene or polyisobutylene. These processes, however, have the disadvantage of requiring the addition of considerable quantities of polyolefins to diminish ageing, and the addition of polyolefins in turn renders the products less resistant to bending and less heat resistant.

In another prior art process, it has also been known to produce impact resistant polystyrene by performing the polymerization in the presence of an amorphic saturated polyolefin and a diolefin containing polymer. The resulting products show quite good resistance to ageing but require at least 1% of a diolefin containing polymer and therefore still have some ageing tendency.

According to the present invention it has been found that impact resistant mixed polymers with better resistance to ageing can be produced from styrene alone or styrene in admixture with copolymerizable monomers by polymerization to a rubber-like mixed polymer of α-mono-olefins in aqueous suspension in the presence of suspension stabilizers and monomer soluble catalysts if use is made of mixtures of 98 to 80% by weight of styrene and 2 to 20% of a terpolymer produced in the presence of mixed Ziegler catalysts from ethylene and propylene and sufficient multiolefins, preferably non-conjugated diolefins with at least 5 carbon atoms to provide in the terpolymer 1 to 3 double bonds per 1000 carbon atoms.

During the polymerization there can advantageously be added to the styrene such copolymerizable monomers as acrylic nitrile, esters of methacrylic acid such as the methyl-, ethyl, butyl- or isooctyl-ester, or esters of acrylic acid such as the methyl-, ethyl-, butyl- or isooctyl-ester, or esters of itaconic-, maleic- or fumaric acid with lower aliphatic alcohols such as methanol, ethanol, isopropanol, butanol, isobutanol, hexanol, octanol or isooctanol.

Especially advantageous is an addition of 20 to 30% by weight of acrylic nitrile and 5 to 10% fumaric acid dibutyl ester, based on the amount of styrene.

The monomers mixed with the styrene for copolymerization therewith are generally added in amounts of 5 to 50%, and preferably 10 to 30% by weight, based on the amount of styrene.

Suitable terpolymers are those of ethylene and propylene which contain 69 to 35% by weight of ethylene and 30 to 65% propylene, and from 0.5 to 10% of multiolefins, preferably non-conjugated diolefins having at least 5 carbon atoms.

Especially suitable are terpolymers which contain 45 to 55% by weight of ethylene, 53 to 38% propylene and 2 to 7% of the multiolefins.

The terpolymers used here are produced by polymerization with the help of known mixed catalysts by the Ziegler method at −20 to +100° C., preferably +20 to +50° C., under normal or slightly increased pressure of 1 to 8 atmospheres. The mixed catalysts consist of metal organic compounds of main Groups I to III of the Periodic Table on the one hand, and compounds of the metals of side Groups IV to VI and VIII on the other hand, as disclosed in German printed application 1,144,924.

Especially suitable are the mixed catalysts of aluminum organic compounds and compounds such as vanadium oxytrichloride and vanadium triacetyl-acetonate. Suitable aluminum organic compounds are diethyl aluminum chloride, ethyl aluminum dichloride and ethyl-aluminum sesquichloride. An especially useful vanadium compound is vanadium oxytrichloride.

A multiolefin is defined as an olefin containing at least two double bonds.

Suitable multiolefins are those with at least 5 carbon atoms whose double bonds are not conjugated, as for example bis-cyclopentadiene, cyclooctadiene, trivinyl-cyclohexane, hexadiene-(1,5)- and hexadiene-(1,4), as disclosed in British specification 880,904.

The terpolymers of ethylene, propylene and the multiolefins mentioned contain per 1000 carbon atoms enough multiolefin to provide at least 1 to 3 double bonds which can be ascertained by infra-red spectroscopy. For example, a terpolymer of ethylene propylene and bis-cyclopentadiene which is produced from these components in the weight ratio of 50:45.5 contains 3 double bonds per 1000 carbon atoms. The amount of multiolefin in the terpolymer depends on the desired amount of copolymerization and is generally not more than 10% of the monomeric olefin mixture. The multiolefins are generally present in amounts of from 3 to 5%. The terpolymers are generally introduced in amounts of from 2 to 20% based on the mixture to be polymerized, and preferably 3 to 10%. The preparation of the terpolymers of the present invention is disclosed in U.S. specification 2,933,480.

The copolymerization is performed as a suspension polymerization in the presence of known suspension stabilizers such as water-soluble cellulose ethers, gelatins or polyvinyl alcohol and also in the presence of monomer-soluble catalysts such as organic peroxides or nitrogen compounds with unstable radicals of the type of azodiisobutyronitrile. For the suspension polymerization the terpolymer is dissolved in styrene or in the monomer mixture and the solution then suspended in water.

The polymerization is performed in a known manner with the exclusion of oxygen and at the temperature that is necessary to achieve the desired degree of polymerization, for which purpose use can be made also of polymerization regulators such as styrene dimers or α-methylstyrene or mercaptans such as tert.-dodecyl-mercaptan which have been used for regulating styrene polymerization as disclosed in German printed applications 1,136,827 and 1,040,793.

The copolymers produced by this invention have without the addition of small amounts of multiolefins greater resistance to notch impacts than the known copolymers. The products are homogeneous, age-resistant and readily workable, especially for the production of impact resistant articles such as tubes or bottles.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

In a 40 l. reactor equipped with a stirrer are introduced per hour 120 l. n-hexane containing per liter hexane 1.0 millimole vanadium oxytrichloride and 120 millimoles ethyl-aluminum-sesquichloride, 3 kg. ethylene and propylene and biscyclopentadiene, the mole ratio of ethylene:proplene:bis-cyclopentadiene being 1:2:0.2. The pressure in the reactor is 4 atü, the temperature 50° C. and the hold up time 20 minutes.

The resulting polymer solution overflowing from the reactor has a solid content of 5% by weight. The solution is first stirred with water and then the solvent (n-hexane) is removed by steam distillation. The resulting terpolymer is dried at 90 to 100° C. The propylene content of the terpolymer was 49 weight percent, the gel-amount 0, the Mooney viscosity 45.

100 parts by weight of an ethylene-propylene-bis-cyclopentadiene terpolymer containing the individual components in the ratio of 50:45:5 parts by weight, having a Mooney viscosity of 45 and containing 3 double bonds per 1000 carbon atoms are dissolved with stirring in an autoclave in 850 parts by weight of styrene, 20 parts acrylic acid ester and 3 parts stearic acid butyl ester. To the mixture is then added a solution containing 7 parts polyvinyl alcohol in 1500 parts water and also 1.6 parts di-tert.-butyl-peroxide.

The mixture is then polymerized with vigorous stirring: three hours at 110° C.; then three hours at 130° C.; and finally 10 hours at 140° C. The resulting fine granuar polymer is filtered and dried.

100 parts by weight of the copolymer are formed into test bars according to DIN (German industrial norms) 53,453, and the following values were found:

Notch impact strength—8.1 cm. kg./cm.$^2$
Impact strength—35 cm. kg./cm.$^2$
Bending strength—582 kg./cm.$^2$
Softening point—85° C.

In the following table corresponding values are given for comparison where:

(a) Instead of the ethylene propylene terpolymer, the same amount of an ethylene propylene mixed polymer is used (weight ratio ethylene:propylene=55:45).

(b) If in addition to the ethylene propylene mixed polymer of (a), 0.2 part by weight polybutadiene is added, then from this comparison it can be seen that the double bonds which were present in the copolymer must also be present in the ethylene propylene mixed polymer.

(c) As described in Example 1, but instead of the 100 parts of the terpolymer, 220 parts were used, and instead of the 850 parts styrene, 730 parts were used. This comparison test which was to determine the upper limit shows that the amount of ethylene-propylene terpolymer cannot be increased much above 20 parts without seriously diminishing the bending strength.

(d) The following comparative test serves to determine the lower limit of the amount of ethylene-propylene terpolymer that can be used. Instead of 100 parts of terpolymer, 10 parts were used and instead of 850 parts styrene, 940 parts were used. The impact strength of the product is then no better than that of ordinary polystyrene.

| | 1 | 1a | 1b | 1c | 1d |
|---|---|---|---|---|---|
| Notch impact strength, cm. kg./cm.$^2$ | 8.10 | 2.80 | 3.00 | 15.00 | 2.00 |
| Impact strength, cm. kg./cm.$^2$ | 35.00 | 15.00 | 16.00 | 55.00 | 25.00 |
| Bending strength, kg./cm.$^2$ | 582.00 | 500.00 | 490.00 | 390.00 | 950.00 |
| Softening point, ° C. | 85.00 | 84.00 | 84.00 | 83.00 | 85.00 |

EXAMPLE 2

40 parts by weight of the ethylene-propylene-bis-cyclopentadiene terpolymer as disclosed in Example 1 are dissolved in 490 parts styrene, 200 parts methacrylic acid methyl ester and 240 parts acrylic nitrile and polymerized by the method of Example 1 in the presence of polyvinyl alcohol as suspension stabilizer and the amount of di-tert.-butyl-peroxide mentioned in Example 1 as polymerization catalyst.

The product was formed into a test bar as in Example 1 and gave the following results:

Notch impact strength, cm. kg./cm.$^2$ _____ 6.80
Impact sertngth, cm. kg./cm.$^2$ _____ 34.00
Bending strength, kg./cm.$^2$ _____ 782.00
Softening point, ° C. _____ 91.00

EXAMPLE 3

128 parts by weight of the terpolymer of Example 1, but having a Mooney viscosity of 49, are dissolved in 672 parts styrene, 200 parts acrylic nitrile, 40 parts fumaric acid dibutyl-ester, 20 parts stearic acid butyl ester and 20 parts paraffin oil and then polymerized by the method of Example 1.

The product was formed into a test bar as in Example 1 and gave the following results:

Notch impact strength, cm. kg./cm.$^2$ _____ 17.00
Impact strength, cm. kg./cm.$^2$ _____ 108.00
Bending strength, kg./cm.$^2$ _____ 694.00
Softening point, ° C. _____ 92.00

When tested, 4% of the bars were not broken during the impact test.

If instead of fumaric acid dibutyl ester, itaconic acid dibutyl ester or fumaric acid diisooctyl ester is used, practically the same results are obtained.

EXAMPLE 4

Example 3 is repeated, but instead of the fumaric acid dibutyl ester, an increased amount of styrene is used. The following values are obtained.

Notch impact strength, cm. kg./cm.$^2$ _____ 11.80
Impact strength, cm. kg./cm.$^2$ _____ 66.80
Bending strength, kg./cm.$^2$ _____ 702.00
Softening point, ° C. _____ 93.00

The copolymers produced in Examples 1 and 3, before being tested, are first aged 8 to 16 days by the method of Bierer Davis and 14 days by the method of Geer (DIN 53,508). No deterioration has set in.

During the ageing test of Bierer Davis, for the copolymers produced according to Example 3, the following results were obtained after 30 days:

Notch impact strength, cm. kg./cm.$^2$ _____ 17.00
Impact strength, cm. kg./cm.$^2$ _____ 92.50

When tested by the method of Geer, the following results were obtained after 60 days:

Notch impact strength, cm. kg./cm.$^2$ _____ 17.40
Impact strength, cm. kg./cm.$^2$ _____ 106.00

The known impact resistant polystyrene types and the acrylic nitrile butadiene-styrene mixed polymers after such ageing show a deterioration of 50%.

Also the known mixed polymers, the ethylene-propylene mixed polymers and the diolefin containing polymers or mixed polymers show a deterioration of more than 20% when tested in that manner.

From the foregoing description, one skilled in the art can, using the preceding description, utilize the present invention to its fullest extent. The following preferred specific embodiments are, therefore, to be construed as merely illustrative, and not limitative of the remainder of the specification and claims in any way whatsoever.

What is claimed is:

1. In a process for producing thermoplastic impact-resistant grafted styrene polymers with improved ageing stability, comprising polymerizing a mixture of 2 to 20 percent by weight of a terpolymer and 98 to 80 percent by weight of styrene and a copolymerizable monomer selected from the group consisting of acrylic nitrile and fumaric acid dibutyl ester in an aqueous suspension system containing suspension stabilizers and monomer-soluble catalysts, the improvement comprising conducting the polymerization without preliminary ozonization of the said mixture, said copolymerizable monomer being present in the amount of 5 to 50 percent by weight based on the amount of said styrene, and said terpolymer having been formed by polymerization of ethylene, propylene and multiolefins consisting essentially of non-conjugated diolefins having at least 5 carbon atoms, in the presence of Ziegler copolymerization catalysts consisting essentially of organic aluminum compounds and vanadium compounds to produce a terpolymer of 60 to 35 percent by weight of ethylene, 30 to 65 percent by weight of propylene and 0.5 to 10 percent of said multiolefins, said terpolymer further being characterized by having 1 to 3 double bonds per 1000 carbon atoms.

2. The product produced by the process of claim 1.

References Cited

UNITED STATES PATENTS

| | | | |
|---|---|---|---|
| 3,370,105 | 2/1968 | De Bell et al. | 260—878 |
| 3,408,424 | 10/1968 | Barkhuff, Jr. | 260—878 |

FOREIGN PATENTS

| | | | |
|---|---|---|---|
| 1,347,881 | 11/1963 | France | 260—878 |

HARRY WONG, Jr., Primary Examiner